Mar. 5, 1929.　　F. H. PARKE　　1,703,896
FLUID PRESSURE BRAKE
Filed July 31, 1925
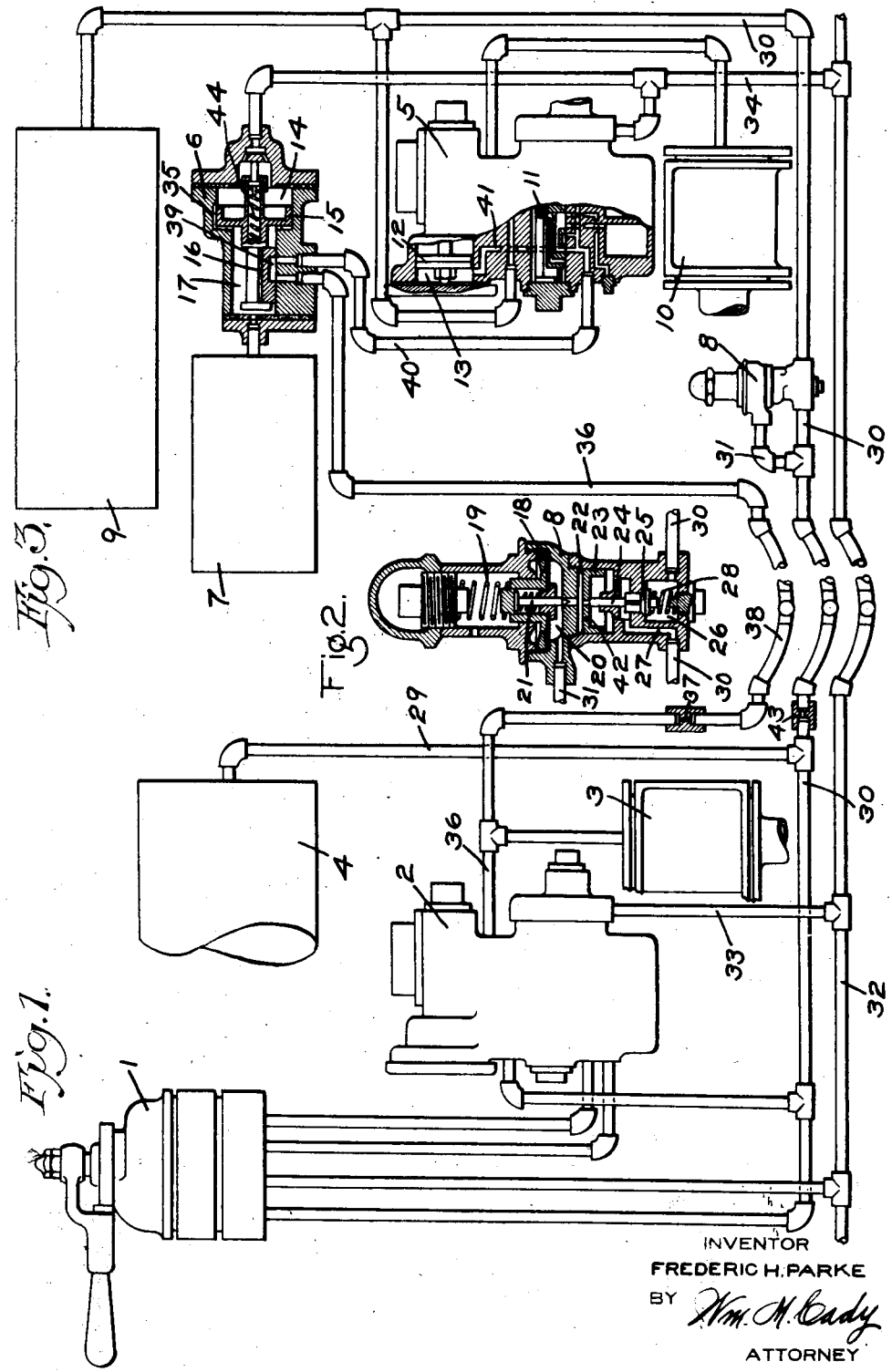
INVENTOR
FREDERIC H. PARKE
BY Wm. M. Cady
ATTORNEY Patented Mar. 5, 1929.

1,703,896

UNITED STATES PATENT OFFICE.

FREDERIC H. PARKE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed July 31, 1925. Serial No. 47,179.

This invention relates to fluid pressure brakes and more particularly to a brake equipment for locomotives adapted to be coupled together.

In the use of locomotives and more particularly electric locomotives it has been proposed to couple, to a main locomotive, additional power generating cabs, which are adapted to be controlled from the regular locomotive cab. In such cases, the brakes are controlled by manipulation of the brake valve device on the main locomotive cab and when a standard combined automatic and straight air brake equipment is employed, an automatic brake application may be effected on the additional cab by operation of the usual brake valve device on the main locomotive, but when a straight air application is effected on the locomotive, there is no provision for operating the brakes on the additional cab.

One object of my invention is to provide means whereby the brakes on two or more locomotives may be controlled from one locomotive, either by straight air or automatically.

Other objects and advantages will appear from the following more detailed description of the invention.

In the accompanying drawing; Fig. 1 is a diagrammatic view, of a brake equipment for a main locomotive with my invention applied thereto; Fig. 2 a vertical section of a charging valve device employed on the additional cab; and Fig. 3 a diagrammatic view, partly in section, of a brake equipment for an auxiliary power generating locomotive, with my invention applied thereto.

While I have shown my invention as applied to a main locomotive and an auxiliary power generating locomotive cab, it will be understood that it may be applied equally well to connected locomotives equipped with standard automatic and straight air brake equipments.

According to the specific application of my invention, as shown in the drawing, the equipment on the main locomotive may comprise the usual brake valve device 1, a distributing valve device 2 of the type used in connection with the well known E T locomotive brake equipment, a brake cylinder 3, and a main reservoir 4. The equipment on the auxiliary power generating cab may comprise a distributing valve device 5 of the same type as on the main locomotive, a cut-off valve device 6 associated with a reservoir 7, a charging valve device 8, a reservoir 9 and a brake cylinder 10.

The distributing valve device 5 includes the usual equalizing slide valve 11 and an application piston 12 contained in application cylinder 13. The cut-off valve device 6 may comprise a casing having a piston chamber 14 containing a piston 15, which is adapted to operate a slide valve 16 contained in valve chamber 17.

The charging valve device 8, as more clearly shown in Fig. 2, may comprise a casing containing a flexible diaphragm 18 subject on one side to the pressure of a coil spring 19 and on the other side to the pressure of fluid supplied to chamber 20. The diaphragm 18 is adapted to operate a pin valve 21 for controlling communication from chamber 20 to a chamber 22 containing a piston 23. Said piston is provided with a piston rod 24 which, upon movement of the piston, is adapted to operate a valve 25 for controlling communication from a chamber 26 to a chamber 27, said valve being normally held seated by a spring 28.

According to my invention, the pipe 36, through which fluid under pressure is supplied to the brake cylinder 3 by operation of the distributing valve device 2 on the main locomotive, is connected through a flexible hose connection 38 to the seat of slide valve 16 of cut-off valve device 6 on the auxiliary locomotive cab, and when piston 15 of valve device 6 is maintained in its normal innermost position, said pipe is connected, through a cavity 39 in slide valve 16, to a pipe and passage 40 leading to the seat of equalizing slide valve 11, said pipe 40 being also connected to passage 41 leading to application cylinder 13. A choke plug is interposed in the pipe 36 on the main locomotive, having a restricted port 37, so that in case of a break-in-two, the loss of fluid through pipe 36 will not be sufficient to prevent maintaining the pressure in the brake cylinder 3 on the main locomotive.

In operation, fluid under pressure from the main reservoir 4 flows from pipes 29 and 30 on the main locomotive through a flexible hose connection between the locomotives to passage 27 where it acts to unseat valve 25, so that fluid under pressure is supplied to chamber 26 and pipe 30 and thence to reservoir 9, charging the same.

Fluid under pressure is supplied from pipe 30 through pipe 31 to diaphragm chamber 20 of the charging valve device 8 and when the pressure of fluid in main reservoir 4 and consequently in chamber 20 of charging valve device 8 has reached a predetermined degree, preferably somewhat less than the standard main reservoir pressure carried in the system, for example 85 pounds, said pressure is sufficient to overcome the pressure exerted on the opposite side of the diaphragm 18 by spring 19, so that said diaphragm will then be moved to unseat pin valve 21, thereby permitting fluid from chamber 20 to flow to chamber 22.

The pressure of fluid so supplied to chamber 22 acts to shift piston 23 so that piston stem 24 is operated to shift valve 25 to its open position, thereby permitting the reservoir 9 to be charged to the full pressure carried in the reservoir 4. If the pressure in pipe 30 should be reduced from any cause, such as a burst hose or a break-in-two, the pressure in pipe 31 and chamber 20 will also be reduced below the degree for which spring 19 is adjusted, and the diaphragm 18 will therefore be moved so as to seat pin valve 21. The fluid under pressure in piston chamber 22 then escapes through a port 42 in piston 23, thereby permitting the spring 28 to seat valve 25 and prevent the escape of fluid from reservoir 9.

The brake pipe 32 is charged in the usual way and fluid therefrom flows through branch pipes 33 and 34 to distributing valve devices 2 and 5. Fluid also flows through branch pipe 34 to piston chamber 14 of cut-off valve device 6, from whence it flows through feed groove 35 to valve chamber 17 and thence to reservoir 7, charging the same. With the fluid pressures on opposite sides of the piston 15 equalized, the piston is maintained in normal position by spring 44.

When it is desired to effect an automatic service application of the brakes, the brake pipe pressure is reduced in the usual way, thereby actuating the distributing valve devices 2 and 5 to supply fluid under pressure to brake cylinders 3 and 10 in the usual way. The reduction in brake pipe pressure also functions to permit the higher pressure in reservoir 7 and valve chamber 16, acting on the opposite side of piston 15 of valve device 6, to shift said piston and consequently slide valve 16 to a position blanking the pipe 36 at the slide valve seat, so that fluid under pressure supplied to brake cylinder 3 is prevented from flowing through pipe 40 to distributing valve device 5.

When it is desired to effect a straight air application of the brakes, the brake valve device 1 is operated to supply fluid under pressure directly to the application cylinder of the distributing valve device 2, thereby actuating the application piston of said distributing valve device to supply fluid under pressure from main reservoir 4 to the brake cylinder 3 in the usual way.

The fluid under pressure so supplied to brake cylinder 3, flows through pipe 36, restriction 37, flexible hose connection 38 to cut-off valve device 6, and since during the straight air application the brake pipe will be charged to the normal degree of pressure, the piston 15 will be maintained in its innermost position and consequently slide valve 16 will be in the position in which pipe 36 is connected through cavity 39 with pipe 40, so that fluid under pressure will flow through said pipes and passage 41 to application cylinder 13.

The pressure of fluid so supplied to application cylinder 13 actuates piston 12 and attached slide valves (not shown) to supply fluid under pressure from reservoir 9 to brake cylinder 10 in the usual way.

The restriction at 37 provided, so that in case the locomotives should be broken apart, the distributing valve device 2 will be able to maintain a sufficient amount of fluid under pressure in the brake cylinder 3 to apply the brakes, even though pipe 36 is open to the atmosphere at hose connection 38. A restriction is also provided at 43 in pipe 30, so that in case of a break-in-two the fluid under pressure in main reservoir 4 will be maintained by the compressor against said restricted opening to atmosphere.

The cut-off valve device 6 also functions in case of a break-in-two, to cut off pipe 40 from pipe 36 so that the fluid under pressure supplied to application cylinder 13, during the automatic brake application, which necessarily follows a break-in-two, will be prevented from escaping to atmosphere through the broken connection in pipe 36.

It will now be evident that by means of my invention the brakes on two locomotives may be controlled, either automatically or by straight air, by manipulation of the brake valve device on one locomotive, and that means are also provided according to my invention to prevent the loss of brakes on either locomotive in case of a break-in-two.

Having now described my invention, what I claim as new and desire to secure by Letters Patent, is:—

1. In a fluid pressure brake, the combination with a brake equipment including a brake cylinder on one vehicle, a brake equipment including a brake cylinder on another vehicle, and a pipe for supplying fluid from the first brake cylinder to the second vehicle for effecting an application of the brakes on the second vehicle, of means operating upon a break-in-two for cutting off communication through said pipe.

2. In a fluid pressure brake, the combination with a brake equipment including a brake cylinder on one vehicle, a brake equipment on another vehicle including a piston operated by an increase in fluid pressure for effecting an application of the brakes, and a pipe connecting said brake cylinder with said piston, of means operating upon a break-in-two for cutting off communication through said pipe.

3. In a fluid pressure brake, the combination with a brake pipe, a brake equipment on one vehicle including a brake cylinder, a brake equipment on another vehicle including means operated by an increase in fluid pressure for effecting an application of the brakes, and a pipe for connecting said brake cylinder to said means, of means operated upon a reduction in brake pipe pressure for cutting off communication through said connecting pipe.

4. In a fluid pressure brake, the combination with a brake equipment on one vehicle including a reservoir adapted to be charged with fluid under pressure, a brake equipment on another vehicle including a reservoir, and a pipe for supplying fluid under pressure from the first reservoir to the second reservoir, of means for preventing the supply of fluid through said pipe until the pressure in the first reservoir has been increased to a predetermined degree.

5. In a fluid pressure brake, the combination with a brake equipment on one vehicle including a brake cylinder, a brake equipment on another vehicle including a valve device having an application piston subject to the pressure of an application cylinder, and a pipe connecting said brake cylinder with said application cylinder, of a brake pipe and a valve device operated upon a reduction in brake pipe pressure for cutting off communication from said application cylinder through said connecting pipe.

In testimony whereof I have hereunto set my hand.

FREDERIC H. PARKE.